United States Patent [19]

Segaud

[11] Patent Number: 4,528,303

[45] Date of Patent: Jul. 9, 1985

[54] POLYMER/FILLER MOLDING COMPOSITIONS

[75] Inventor: Christian Segaud, Aulnay Sous Bois, France

[73] Assignee: Rhone-Poulenc Specialites Chimiques, Courbevoie, France

[21] Appl. No.: 497,721

[22] Filed: May 24, 1983

[30] Foreign Application Priority Data

May 28, 1982 [FR] France .................. 82 09524

[51] Int. Cl.$^3$ ............................. C08K 9/06; C08K 3/34
[52] U.S. Cl. .................... 523/212; 523/213; 523/218; 524/445; 524/451; 524/456; 524/552; 524/588; 524/600; 524/602; 524/606; 524/611
[58] Field of Search .............. 523/212, 213, 218; 524/445, 451, 456, 606, 611, 600, 602, 588, 552

[56] References Cited

U.S. PATENT DOCUMENTS

| | | | |
|---|---|---|---|
| Re. 28,646 | 12/1975 | Hedrick et al. | 523/212 |
| 3,419,517 | 12/1968 | Hedrick et al. | |
| 4,211,690 | 7/1980 | Asano et al. | 524/451 |
| 4,229,504 | 10/1980 | Brachman | 524/451 |
| 4,255,303 | 3/1981 | Keogh | 524/451 |
| 4,430,157 | 2/1984 | Lalancette | 152/3 |

FOREIGN PATENT DOCUMENTS 18747  1/1982  Japan ........................ 524/451

OTHER PUBLICATIONS

Derwent Abst. 92182D/50 (J56141341) 11-1981 Hayashi Kasei.
Chem. Abs. 83-80506 (1975) Bozhenov et al., Mar. 1975.
Chem. Abs. 95-82040 (1981) Kishikawa, May 1981.
Chem Abs. 98-216561 (1983) Hayashi Kasei.
H. S. Katz et al., "Handbook of Fillers and Reinforcements for Plastics," 1978, pp. 160-171.

Primary Examiner—Herbert J. Lilling
Attorney, Agent, or Firm—Burns, Doane, Swecker & Mathis

[57] ABSTRACT

Molding compositions for the fabrication of shaped articles having enhanced mechanical properties are comprised of (i) a polymeric matrix, (ii) an inorganic reinforcing filler material therefor, and, advantageously, (iii) a polymer/filler coupling agent, said reinforcing filler material consisting essentially of intimate admixture of enstatite and silica advantageously prepared by calcination of a precursor clay at a temperature of at least 800° C.

20 Claims, No Drawings

POLYMER/FILLER MOLDING COMPOSITIONS

BACKGROUND OF THE INVENTION

1. Field of the Invention

The present invention relates to novel molding compositions comprising a polymer matrix and an inorganic reinforcing filler therefor, in which the mineral filler is bonded to the polymer, if appropriate by means of a coupling agent. The present invention more especially relates to molding compositions based on reinforced polymers of a thermoplastic, thermosetting or elastomeric nature, in which the mineral filler exhibits an improved bonding capacity. The present invention also relates to processes for the preparation of such compositions, means adapted for carrying out such processes, and the shaped articles obtained via the molding thereof.

2. Description of the Prior Art

It is well known to this art that polymers can contain non-polymeric materials as fillers, in order to improve certain of their properties. Thus, various mineral or inorganic fillers can be used, in particular in order to improve the mechanical properties of the polymer, for example, its expansion coefficient and/or its abrasion resistance and/or its modulus and/or its tensile strength and/or its flexural strength and/or its resilience. The key to the development of such compositions containing fillers resides in establishing an effective bond between the filler and the polymer. Without this bond, the addition of the filler may even impair certain mechanical properties of the polymer.

To establish this effective bond, the nature of the filler will be changed, but it is envisaged, if necessary, to additionally employ an effective coupling agent, namely, a compound which will be able to react both with the polymer and with the inorganic filler. It must possess at least one group capable of reacting with the polymer and at least one other group capable of reacting with the functional groups present on the surface of the filler (usually OH groups). Certain organosilicon compounds have been used as coupling agents. Suitable compounds of this type are described, for example, in French Patent No. 1,399,049; as groups capable of bonding to the filler, same typically comprise alkoxysilane groups -Si-OR, in which R represents a lower alkyl radical.

In general, not all mineral fillers are equally effective as reinforcing fillers. A necessary condition for this efficacy is the existence, on the surface of the filler, of an adequate density of functional groups which will be able to react with the polymer, and if appropriate, the coupling agent. Numerous mineral fillers have been proposed, among which the most representative consist of the following species: calcium carbonate, titanium oxide, micronized silica, an aluminosilicate such as calcined kaolin, a magnesosilicate such as talc, wollastonite and calcium sulfate.

Experiments conducted by the assignee hereof employing nylon 6,6 as the polymer matrix have resulted in the observation that calcined kaolin and talc would appear to be the fillers which make it possible to obtain the best compromise in terms of mechanical properties; it should be added that talc is preferred because such a filler results in less shrinkage of the shaped articles molded therefrom.

SUMMARY OF THE INVENTION

Accordingly, a major object of the present invention is the provision of improved molding compositions comprised of a polymeric matrix and a markedly more effective filler material therefor, such filler material being adopted to impart such balancing of mechanical properties hitherto unknown to this art.

Briefly, the present invention features improved molding compositions which comprise:

(i) a polymeric matrix;

(ii) a mineral reinforcing filler therefor; and, if appropriate, (iii) a coupling agent, said improved molding compositions being characterized in that the mineral filler essentially consists of an intimate admixture of enstatite and silica, such as is obtained by the calcination of appropriate clay species at a temperature of at least 800° C.

DETAILED DESCRIPTION OF THE INVENTION

More particularly according to the present invention, representative clay species adapted for calcination consistent herewith are chlorite, illite, palygorskite, saponite, talc, or mixtures of such species.

The polymers which are reinforced according to the present invention can be, firstly, synthetic thermoplastics, with a high number-average molecular weight having a value of at least 2,000, which soften when they are exposed to sufficient heat and which return to their original state when they are cooled to ambient temperature. These thermoplastics include, for example: polyolefins; polyvinyl chloride and copolymers thereof; polyamides; saturated polyesters; polycarbonates; and thermoplastic polyurethanes.

Preferred classes of thermoplastic polymers useful in the subject compositions are polyolefins, polyamides and polycarbonates. Examples of representative species of polyolefins are: high-density and low-density polyethylenes; polypropylene; and ethylene/propylene copolymers. By the term "polyamides", there is essentially intended those products obtained by the polycondensation of diacids and diamines, by the homopolycondensation of amino acids or by the polymerization of lactams. Examples of representative species of such polyamides are: nylon 6,6 (polymer of hexamethylenediamine and adipic acid); nylon 6,10 (polymer of hexamethylenediamine and sebacic acid); nylon 6 (polymer of $\epsilon$-caprolactam); nylon 7 (polymer of aminoheptanoic acid); nylon 9 (polymer of aminononanoic acid); nylon 11 (polymer of $\omega$-aminoundecanoic acid); mixtures of these polymers; and copolymers obtained from the above-mentioned monomers. By the term "polycarbonates", there is essentially intended the products resulting from the reaction of carbonic acid with dihydroxylated aromatic compounds in which the hydroxyl groups are directly attached to an aromatic nucleus. A particularly representative example is poly-(bisphenol A) carbonate.

The polymers which are reinforced according to the present invention can be, secondly, synthetic thermosetting materials which, under the action of heat, begin by softening (if they are not already in the soft form) and then gradually harden and transform into a solid state, which they will retain indefinitely. These thermosetting materials include, for example: phenolic resins; unsaturated polyesters; epoxy resins; polyimides; and crosslinked polyurethanes.

Preferred classes of thermosetting polymers useful in the subject compositions are phenolic resins and polyimides. By the term "phenolic resins", there is essentially intended the products obtained by the polycondensation of aldehydes and phenols. Examples of representative species of such phenolic resins are condensates of phenol, resorcinol, cresol or xylencol with formaldehyde or furfural. By the term "polyimides", there is essentially intended the products obtained by reacting an unsaturated dicarboxylic acid, N,N'-bis-imide with a primary polyamine. Products of this type are described in French Patent No. 1,555,564, in U.S. Pat. Nos. 3,562,223 and 3,658,764 and in U.S. Pat. No. Re. 29,316. A particularly representative example is the product obtained by reacting N,N'-4,4'-diphenylmethane-bis-maleimide with 4,4'-diaminodiphenylmethane.

The polymers which are reinforced according to the present invention can be, thirdly, elastomeric materials of natural or synthetic origin. These materials include, for example: natural rubbers; homopolymers of conjugated dienes such as butadiene and isoprene; copolymers derived from ethylenic and/or vinylaromatic monomers and conjugated dienes, such as styrene/butadiene copolymers, isobutylene/isoprene copolymers (butyl rubbers) and ethylene/propylene/hexa-1,4-diene copolymers; butadiene/acrylonitrile copolymers; halogenated rubbers such as chlorinated natural rubbers, brominated and chlorinated butyl rubbers and polychloroprenes; elastomeric polyurethanes; polysulfides; and elastomeric silicones.

Preferred classes of elastomeric polymers useful in the subject compositions are polychloroprenes and elastomeric silicones. By the term "elastomeric silicones", there is essentially intended the products obtained by the cross-linking, under the action of heat, of polysiloxanes bearing alkyl, alkenyl, cycloalkyl, phenyl and/or hydroxyl groups. A particularly representative example is a dimethylpolysiloxane elastomer containing a small proportion of vinyl groups.

Among the various types of polymers mentioned above, the polymers which are even more preferably suitable for being reinforced according to the present invention consist of polyamides. Nylon 6,6 and nylon 6 and mixtures thereof are very particularly preferred.

The mineral reinforcing fillers according to the present invention comprise appropriate clays which have been subjected to a calcination treatment. This treatment consists of heating the selected mineral to a temperature of at least 800° C., the process being carried out in the atmosphere, under a nitrogen atmosphere or under a moist air atmosphere; it is possible to carry out the process in a static furnace, in a rotary furnace or in a flash calcination apparatus. This calcination causes, on the one hand, a dehydroxylation reaction of the mineral, which will evolve its structural water above 800° C., and, on the other hand, a conversion reaction of its initial crystallographic structure, which will give rise to an intimate admixture of enstatite and silica in the form of amorphous silica and/or of crystalline silica in the cristobalite state. As heretofore noted, the mineral filler "essentially consists" of an intimate admixture of enstatite and silica; by the expression "essentially", it is intended that the calcination mixture can also contain small amounts of mineral impurities associated with the nature of the deposit, which do not constitute a problem. The heating time is not critical and can vary over wide limits, for example, ranging from a few fractions of a second (in the case of flash calcination) to about ten hours (in the case of calcination in a static or rotary furnace). Of course, this time must in all cases be sufficient to perform the crystallographic conversion referred to above.

The mineral reinforcing filler which is preferably used according to this invention consists of talc calcined by heating in a static or rotary furnace at a temperature ranging from 900° C. to 1100° C. for a period of time ranging from two hours to five hours. It should be noted that the use of such talc to reinforce polyamides is a very particularly preferred embodiment of the invention.

The particle size of the reinforcing filler is a variable which is not of an especially critical nature; usually, a filler is used which contains particles having dimensions ranging from 0.1 micrometer to 100 micrometers and preferably ranging from 0.5 micrometer and 50 micrometers. As regards the specific surface area of the particles, this too is not an especially critical variable; usually, same ranges from 1 to 25 $m^2/g$ and preferably from 2 to 15 $m^2/g$.

The amount of mineral reinforcing filler used in formulating the compositions according to the invention can vary over wide limits. The maximum proportion is limited mainly by the capacity of the polymer to bond the reinforcing filler into a cohesive mass; usually, this maximum proportion represents about 90% of the weight of the polymer plus mineral reinforcing filler taken together. The minimum proportion corresponds to the amount of filler which is necessary to initiate an improvement in the mechanical properties of the polymer; usually, this minimum proportion represents about 2% of the weight of the polymer plus mineral reinforcing filler taken together. The proportions of reinforcing fillers which can be used therefore range from 2% to 90%; preferably, these proportions range from 10% to 60%.

The compositions according to the present invention can also comprise a coupling agent, and this is an especially preferred embodiment thereof. Such coupling agent is typically selected from among the polyfunctional organosilicon compounds referred to above in the introductory portion of the present specification. These compounds contain at least one alkoxysilane group capable of bonding to the mineral filler and at least one other group capable of bonding to the polymer. The nature of this other functional group will of course depend upon the polymer used. Thus, coupling agents containing vinyl groups are compounds which can be used, for example, with polyolefins and thermosetting polyesters; examples of suitable organosilicon compounds are: vinyltrimethoxysilane, vinyltriethoxysilane and vinyltri-(2-methoxyethoxy)-silane. Coupling agents containing acrylic or methacrylic groups are also compounds which can be used with polyolefins and thermosetting polyesters; an example of such a suitable organosilicon compound is: γ-methacryloxypropyltrimethoxysilane. Amino coupling agents are compounds which can be used, for example, with polyvinyl chloride, polyamides, thermoplastic polyesters, polycarbonates, thermoplastic polyurethanes, phenolic resins, epoxy resins and polyimides; examples of suitable such organosilicon compounds are: γ-aminopropyltrimethoxysilane, γ-aminopropyltriethoxysilane and N-(β-aminoethyl)-γ-aminopropyltrimethoxysilane. Epoxidized coupling agents are also compounds which can be used with thermoplastic polyesters, phenolic resins and epoxy resins; examples of suitable such organosilicon compounds are: β-(3,4-epoxycyclohexyl)-ethyltrimethoxysilane and γ-glycidoxypropyltrimethoxysilane. Coupling agents containing mercapto groups are compounds which can be used, for example, with polychloroprenes; an example of a suitable such organosilicon compound is: γ-mercaptopropyltrimethoxysilane.

Azidosilanes (or silanesulfonylazides) are also suitable as coupling agents; compounds of this type are described by G. A. McFarren et al, in the article: *Polymer Engineering and Science*, 17, No. 1, pages 46 to 49 (1977).

The amount of coupling agent necessary to ensure a good bond between the mineral reinforcing filler and the base polymer is relatively small. An amount of only 0.1% of coupling agent, relative to the weight of the filler, can be used to produce a composition having mechanical properties superior to those of the composition containing an untreated filler. In general, amounts of coupling agent ranging from 0.3% to 4% have proved to be very satisfactory. It should be noted that larger amounts can also be used without detracting from the properties of the finished product.

The reinforced polymeric compositions according to the present invention can be prepared in various fashions which are in and of themselves known to the art.

Starting from thermoplastic and thermosetting polymers, the various constituents are preferably mixed in two periods: a first period in which the various constituents are agitated together at ambient temperature in a conventional powder mixer (which can be simply the feed hopper of an extruder) and a second period in which this mixture is homogenized by hot malaxation in single-screw or multiscrew extruder. After this treatment, the compositions of the invention are generally in the form of rods, which are then chopped into granules; these granules will subsequently be used to form the desired ultimate shaped articles in conventional injection-molding, transfer-molding or extrusion-molding apparatuses.

Starting from elastomeric polymers, the various constituents are generally mixed by introducing all of the various constituents directly into a suitable slow mixer (a slow mill, a mixer of the internal type, malaxating rolls, or the like) heated to the appropriate temperature. After this treatment, the compositions of the invention are generally in the form of pastes of variable thickness; these pastes will subsequently be used to shape the compositions as desired, using the customary techniques for shaping elastomeric materials, for example, by calendering or by molding. After shaping of the compositions as desired, they are then subjected to a vulcanization or curing treatment.

In the preferred case where a coupling agent is used, the latter can be incorporated in various ways into the medium for the preparation of the compositions according to the invention: in a first embodiment, the coupling agent can be deposited beforehand on the filler which is to be used to reinforce the polymer; in a second embodiment, the coupling agent can be deposited beforehand on the polymer before the filler is added; in a third embodiment, the coupling agent can be mixed directly with the polymer and the filler. Taking the foregoing into account, the expression "various constituents" mentioned above in respect of the methods of preparation of the compositions according to the invention will denote the following:

embodiment 1: pretreated mineral filler plus copolymer;
embodiment 2: mineral filler plus pretreated polymer;
embodiment 3: polymer plus mineral filler plus coupling agent.

Where a coupling agent is used, the treatment therewith is usually carried out by directly or gradually incorporating same, in the pure state or dissovled in a suitable solvent, into the filler (embodiment 1), into the polymer (embodiment 2) or into the filler plus polymer together (embodiment 3). In the case of embodiment 1 in particular, it is possible to treat the filler by the technique of fluidized bed mixing or by the technique employing a fast mixer.

The polymeric compositions according to the invention can also be prepared by formulating a masterbatch thereof, presented in the form of granules or a paste based on part of the polymer to be reinforced, filler and, if appropriate, coupling agent, which will then be mixed, before processing, with granules or a paste of the remainder of the polymer to be reinforced.

Yet another method for the preparation of the compositions of the invention consists of polymerizing the monomers forming the polymer in the presence of the optionally treated reinforcing filler, it being possible for the polymerization to take place in the mold having the shape of the desired article. The treatment with the coupling agent, if such treatment is used, can also be carried out during the polymerization.

The polymeric compositions according to the invention can also contain one or more additives such as, for example, pigments, stabilizers, nucleating agents, hardening and vulcanization accelerators, modifiers of flow characteristics, and compounds for improving the surface finish of the articles or for modifying the behavior of the compositions during molding. The amounts of these additives incorporated do not generally exceed 40% of the weight of the polymer matrix.

Starting from polyamides, which are the particularly preferred polymers for carrying out the present invention, polymeric compounds consisting of copolymers derived from at least one olefin and at least one other copolymerizable monomer containing carboxyl and/or carboxylate groups can also be incorporated into the compositions of the invention, in order to further improve their mechanical properties at temperatures as low as those ranging from 0° C. to −20° C.

More precisely, the following can be used in this context:

(i) olefinic copolymers derived from an aliphatic α-olefin containing from 2 to 6 carbon atoms (for example: ethylene, propylene, but-1-ene, pent-1-ene or hex-1-ene) and at least one compound belonging to the class comprising α,β-unsaturated monocarboxylic or dicarboxylic acids containing from 3 to 8 carbon atoms (for example: acrylic acid, methacrylic acid, maleic acid, fumaric acid, itaconic acid or vinylbenzoic acid) and lower alkyl esters and anhydrides derived from these acids; examples of suitable copolymers are: ethylene/acrylic acid, ethylene/methacrylic acid and ethylene/acrylic acid/methyl methacrylate copolymers;

(ii) olefinic copolymers containing carboxyl and/or carboxylate groups and derived from ethylene and at least one α-olefin having from 3 to 6 carbon atoms. Propylene is preferably used as the α-olefin having from 3 to 6 carbon atoms, but another α-olefin of this type, in particular but-1-ene, pent-1-ene or hex-1-ene, can be selected in place of or in addition to propylene. The introduction of the carboxyl and/or carboxylate groups can be carried out either by direct copolymerization of the mixture of ethylene/α-olefin having from 3 to 6 carbon atoms with at least one unsaturated compound belonging to the class comprising α,β-unsaturated dicarboxylic acids containing from 4 to 8 carbon atoms (maleic acid, fumaric acid or itaconic acid) and lower alkyl esters and anhydrides derived from these acids, or by grafting of the acid compound (or compounds) (acid and/or derivative) onto the olefinic base, this being induced by ionization, by hydroperoxidation or under the influence of heat and pressure. Examples of suitable copolymers are: the copolymer of maleic anhydride grafted onto ethylene/propylene and the copolymer of fumaric acid grafted onto ethylene/propylene;

(iii) copolymers containing carboxyl and/or carboxylate groups and derived from ethylene, at least one α-olefin having from 3 to 6 carbon atoms and at least one unconjugated diene. Here again, it is preferred to use propylene as the α-olefin having from 3 to 6 carbon atoms. The unconjugated diene usually consists of an aliphatic diene containing at least 6 carbon atoms, which possesses a terminal double bond and an internal double bond; hexa-1,4-diene is preferably employed. The introduction of the carboxyl and/or carboxylate groups is carried out by treating the mixture of ethylene α-olefin/diene as indicated above in the case of the mixture of ethylene/α-olefin. Examples of suitable copolymers are: the copolymer of maleic anhydride grafted onto ethylene/propylene/hexa-1,4-diene and the copolymer of fumaric acid grafted onto ethylene/-propylene/hexa-1,4-diene.

The copolymers, containing functional groups, which belong to the categories outlined above have already been used to reinforce polyamides; for greater detail regarding their definition and the conditions for their use, reference is made to French Patent No. 2,311,814. The amounts of copolymers, containing functional groups, which are to be used, if appropriate, usually represent 2% to 60% of the weight of the base polyamide of the composition.

The compositions of the present invention are characterized by mechanical properties which could not be hitherto obtained with polymers, in particular polyamides, reinforced with minerals. More specifically, it is possible to develop polyamides, containing fillers, which have a flexural modulus (as measured under the conditions defined below) of more than 4,300 MPa, a notched impact strength (as measured under the conditions defined below) of more than 5 kJ/m$^2$ and a heat distortion temperature under load (as measured under the conditions defined below) above 85° C. The polyamide compositions of the prior art which contain talc (non-calcined) as the filler, have a flexural modulus which can reach and exceed 6,000 MPa but same generally have a notched impact strength of at most 4 kJ/m$^2$. As regards polyamide compositions containing calcined kaolin as the filler, although they have a notched impact strength which is generally satisfactory, they nevertheless have a flexural modulus which remains below the value of 4,300 MPa referred to above, and a heat distortion point under load below 85° C.

In order to further illustrate the present invention and the advantages thereof, the following specific examples are given, it being understood that same are intended only as illustrative and in nowise limitative.

EXAMPLE 1

The following materials were directly intimately admixed in a Rohn mixer (Engelsmann):

(1) 3,500 g of nylon 6,6 marketed by Rhone-Poulenc Specialites Chimiques under the trademark Technyl A 216;

(2) 1,500 g of talc marketed by the Societe des Talcs de Luzenac, which had been calcined for 4 hours in a static furnace at a temperature of 1000° C.; the particle size distribution of this filler was as follows: 100% of particles smaller than 20 micrometers; 90% of particles smaller than 10 micrometers; 60% of particles smaller than 5 micrometers; and 20% of particles smaller than 2 micrometers; its specific surface area was about 5 m$^2$/g; and (3) 15 g of γ-aminopropyltriethoxysilane marketed by Union Carbide under the trademark Silane A 1100.

This mixture was homogenized at ambient temperature and was then introduced into the feed hopper of a double-screw extruder of trademark Werner-Pfleiderer, type ZSK 30, in order to suitably disperse the mineral filler in the polyamide matrix. The temperature profile of the extrudate was equilibrated under the following uniform operating conditions:

(a) inlet: 262°;
(b) middle of extruder body: 270° C.;
(c) end: 272° C.;
(d) die: 270° C.

The speed of rotation of the screws was fixed at 200 rpm. The output of extruded product was on the order of 11.4 kg/hour. The extruder was equipped with a die having 3 orifices, and rods were obtained which were then chopped into granules having a length of about 3 mm and a diameter of 1.5 mm.

In order to test the mechanical properties of the articles obtained from these granules, a number of tests were carried out, the nature of which is indicated below:

(I) flexion tests: the flexural strength and flexural modulus are measured as indicated by ASTM Standard Specification D 790, and the heat distortion temperature under load (HDTL) was measured as indicated by ASTM Standard Specification D 648; and (II) Charpy impact tests: the Charpy impact strengths for notched test-pieces were measured as indicated by ASTM Standard Specification D 256, using test-pieces conditioned at EH O (the test-pieces were placed in a desiccator over silica gel and dried again for 24 hours at ambient temperature under a reduced pressure of $0.67.10^2$ to $1.33.10^2$ Pa before carrying out the measurements).

In order to prepare the test-pieces required to carry out these tests, a molding was made by introducing these granules into an injection-molding machine of trademark Buhler Rover, type 100 B. The mold was of the "finger" type, each finger corresponding to a test-piece whose shape and dimensions correspond to those defined by the above-mentioned ASTM Standard Specifications. In this machine, the molding composition in the form of granules was melted at a temperature of 270° C. to 280° C. while the mold was maintained at a temperature of 60° C. The injection pressure was $750.10^5$ Pa. The duration of one injection cycle was 30 seconds. The results of the flexion and impact tests are reported in Table 1 which follows.

As a comparative test (test A), the same operations as those described above were repeated, but this time non-calcined talc was used.

Again as a comparative test (test B), the same operations as those described above were repeated, but this time, in place of the 1,500 g of calcined talc, the same amount of calcined kaolin marketed by English China Clays under the trademark Polestar 200 R was used. The particle size distribution of this filler was as follows: 99.9% of particles smaller than 50 micrometers; 95% of particles smaller than 10 micrometers; and 60% of particles smaller than 2 micrometers; its specific surface area was about 8.5 m²/g.

TABLE 1

| EXAMPLE/TEST | FLEXION Strength MPa | FLEXION Modulus MPa | HDTL °C. | CHARPY NOTCHED IMPACT STRENGTH kJ/m² |
|---|---|---|---|---|
| 1 | 154 | 5,120 | 116 | 6.2 |
| A | 157 | 6,360 | 141 | 4 |
| B | 146 | 4,250 | 73 | 6.5 |

The molded articles containing calcined talc (Example 1) also had a light beige coloration, which is preferable to the grey coloration of the articles containing non-calcined talc (test A). The articles containing calcined kaolin (test B) had a substantially darker beige coloration.

EXAMPLE 2

The same operations as those described above in Example 1 were repeated, but this time, in place of the 1,500 g of calcined talc, the same amount of palygorskite calcined for 4 hours at 850° C. was used. This clay species originates from the Pout au Senegal deposit of Rhone-Poulenc Chimie de Base. The particle size distribution of this filler was as follows: 100% of particles smaller than 50 micrometers; 95% of particles smaller than 20 micrometers; 90% of particles smaller than 10 micrometers; 80% of particles smaller than 5 micrometers; and 70% of particles smaller than 2 micrometers; its specific surface area was about 9 m²/g.

The mechanical properties of the molded articles obtained were as follows:

| (I) flexion tests: | strength: | 133 MPa |
| | modulus: | 1,115 MPa |
| | HDTL: | 77° C. |
| (II) Charpy notched impact strength: | | 6 kJ/m² |

EXAMPLE 3

The following materials were directly intimately admixed, for 6 minutes, at ambient temperature, in a fast mixer from Henschel, rotating at 1,500 rpm:

(i) 1,500 g of calcined talc identical to that described above in Example 1; and (ii) 15 g of vinyltriethoxysilane marketed by Union Carbide under the trademark Silane A 151.

The mineral reinforcing filler thus obtained, onto which the coupling agent had been deposited, was then introduced into a Rohn mixer containing 3,500 g of polypropylene marketed by British Petroleum under the trademark Napryl 61400 AG. After the entire mass had been agitated at ambient temperature, the resulting mixture was homogenized by hot malaxation in the Werner-Pfleiderer extruder used in Example 1; the temperature profile was as follows:

(a) inlet: 240° C.;
(b) middle of extruder bodies: 230° C.;
(c) end: 230° C.;
(d) die: 230° C.

The speed of rotation of the screws was fixed at 200 rpm; the output of extruded product was on the order of 12 kg/hour.

The rods obtained were granulated and the granules were then subjected to a molding operation using the injection-molding machine described above in Example 1. In this machine, the granules were melted at a temperature on the order of 240° C. to 250° C. while the mold was maintained at a temperature of 45° C. The injection pressure was 750.10⁵ Pa. The duration of the injection cycle was 25 seconds. The results of the flexion and impact tests are reported in Table 2 which follows.

As a comparative test (test C), the same operations as those described above were repeated, but this time, in place of the 1,500 g of calcined talc, the same amount of calcined kaolin marketed by Freeport Kaolin under the trademark Whitetex was used. The particle size distribution of this filler was as follows: 99.9% of particles smaller than 10 micrometers; 90% of particles smaller than 5 micrometers; and 60% of particles smaller than 2 micrometers; its specific surface area was about 10 m²/g.

TABLE 2

| EXAMPLE/TEST | FLEXION STRENGTH MPa | FLEXION MODULUS MPa | HDTL °C. | CHARPY NOTCHED IMPACT STRENGTH kJ/m² |
|---|---|---|---|---|
| 3 | 57 | 3,235 | 72 | 3.8 |
| C | 56 | 2,805 | 64 | 3.9 |

EXAMPLE 4

The same operations as those described above in Example 1 were repeated, but this time 3,500 g of a poly(bisphenol A) carbonate marketed by General Electric under the trademark Lexan 101 were used.

The mixture of polycarbonate/calcined talc/silane was extruded under the following temperature conditions:

(a) extruder inlet: 280° C.;
(b) middle of extruder body: 285° C.;
(c) end: 290° C.;
(d) die: 300° C.

The speed of rotation of the screws was fixed at 200 rpm; the output of extruded product was on the order of 13 kg/hour.

The granules obtained were molded using the injection-molding machine described above, under the following conditions: temperature of the material: 305° C. to 320° C.; temperature of the mold 85° C.; injection pressure: 750.10⁵ Pa; and injection cycle: 60 seconds. The results of the flexion and impact tests are reported in Table 3 which follows.

As a comparative test (test D), Example 4 was repeated, the 1,500 g of calcined talc being replaced by the same amount of non-calcined talc.

TABLE 3

| EXAMPLE/TEST | FLEXION Strength MPa | FLEXION Modulus MPa | HDTL °C. | CHARPY NOTCHED IMPACT STRENGTH kJ/m² |
|---|---|---|---|---|
| 4 | 123 | 4,875 | 129 | 4.5 |
| D | 110 | 5,455 | 131 | 3.2 |

EXAMPLE 5

The following materials were directly intimately admixed in a Rohn mixer:

(i) 1,500 g of a powdered phenol/formaldehyde polycondensate of the novolak type, having a melting point of 79° C. and an apparent viscosity of 17 Pa.s at 132° C.;

(ii) the mixture resulting from the prior treatment, carried out as indicated above at the beginning of Example 3, of 1,500 g of calcined talc (identical to that described in Example 1) with 15 g of γ-aminopropyl-triethoxysilane;

(iii) 490 g of wood sawdust;

(iv) 230 g of hexamethylenetetramine;

(v) 20 g of alkaline earth metal hydroxide;

(vi) 3 g of zinc stearate; and (vii) 0.5 g of a black dyestuff marketed by Bayer under the trademark Phenol Schwarz L.

After the entire mass had been agitated at ambient temperature, the resulting mixture was homogenized by hot malaxation in the Werner-Pfleiderer extruder used in Example 1; the temperature profile was as follows:

(a) extruder inlet: 25° C.;
(b) middle of extruder bodies: 45° C.;
(c) end: 105° C.;
(d) die: 105° C.

The speed of rotation of the screws was fixed at 200 rpm; the output of the extruded product was on the order of 15 kg/hour.

The product exiting the extruder was ground to give a powder, which was first heated for 30 minutes at 90° C. and then compression-molded into the form of small plates of dimensions 120×120×4 mm, using a machine from Pinette-Emidecau, operating at a temperature of 165° C. and under a pressure of 400.10$^5$ Pa for 3 minutes 30 seconds. Test-pieces, the shape and dimensions of which correspond to the ASTM Standard Specifications given above in Example 1, were then cut out of these plates. The results of the flexion and impact tests are reported in Table 4 which follows.

As a comparative test (test E), Example 5 was repeated, the 1,500 g of calcined talc being replaced by the same amount of non-calcined talc.

TABLE 4

| EXAMPLE/ TEST | FLEXION | | | CHARPY NOTCHED IMPACT STRENGTH kJ/m$^2$ |
|---|---|---|---|---|
| | Strength MPa | Modulus MPa | HDTL °C. | |
| 5 | 109 | 12,350 | 195 | 1.6 |
| E | 62.2 | 11,370 | 192 | 1.4 |

EXAMPLE 6

The following materials were directly intimately admixed in an internal mixer of the Bandeburry type from Farrel:

(i) 1,000 g of polychloroprene marketed by Distugil under the trademark Butaclor MC 30;

(ii) 40 g of magnesia marketed by Merck under the trademark Maglite D; and (iii) 20 g of an antioxidant additive marketed by Vulnax under the trademark Permanax OD.

After agitation for 3 minutes, the following materials were then introduced into this mixer;

(iv) the mixture resulting from the prior treatment (carried out as indicated above at the beginning of Example 3) of 600 g of talc marketed by the Cyprus Industrial Corporation under the trademark Mistron Vapor, which had been calcined for 4 hours in a static furnace at a temperature of 950° C., with 18 g of γ-mercaptopropyltrimethoxysilane marketed by Union Carbide under the trademark Silane A 189; the calcined talc employed had the following particle size distribution: 100% of particles smaller than 20 micrometers; 80% of particles smaller than 10 micrometers; 55% of particles smaller than 5 micrometers; and 15% of particles smaller than 2 micrometers; its specific surface area was about 4 m$^2$/g; and (v) 100 g of the above-mentioned constituents were mixed together for a period of 12 minutes at a temperature on the order of 70° C.

The cake obtained was transferred to malaxating rolls of type LV from Blere and was malaxated for an additional 12 minutes, at ambient temperature, in the presence of the following additional ingredients:

(vi) 50 g of zinc oxide;

(vii) 10 g of ethylenethiourea marketed by du Pont de Nemours under the trademark NA 22; and (viii) 5 g of tetramethylthiuram disulfide marketed by Vulnax under the trademark Vulcafor TMDT.

The mixture which was finally obtained was vulcanized in a Pinette-Emidecau compression-molding machine, in a mold, operating at 160° C. and under a pressure of 250.10$^5$ Pa for 12 minutes. Test-pieces, the shape and dimensions of which correspond to the standard specifications governing the mechanical tests carried out, were then cut out. The tests which were carried out were as follows: tensile tests: the ultimate tensile strength and the modulus of elasticity at 200% elongation were measured as indicated by French Standard Specification T 46 002; tear tests: the tear strength was measured as indicated by French Standard Specification T 46 007 (method C); measurement of residual deformations after compression after 24 hours at 70° C. (abbreviated to RDC): this was carried out as indicated by French Standard Specification T 46 011; and measurement of the abrasion resistance by the Zwick method. The results of the mechanical tests carried out are reported in Table 5 which follows.

As a comparative test (test F), Example 6 was repeated, the 600 g of calcined talc being replaced by the same amount of non-calcined talc.

TABLE 5

| PROPERTIES | EXAMPLE/TEST | |
|---|---|---|
| | 6 | F |
| Tensile strength (MPa) | 15.5 | 12 |
| Modulus at 200% elongation (MPa) | 11 | 9.5 |
| Tear strength (daN/cm) | 43 | 51 |
| RDC (%) | 6 | 11 |
| Abrasion (loss in mm$^3$) | 190 | 250 |

EXAMPLE 7

The following materials were directly intimately admixed in a calender from Troster:

(i) 100 g of a polydimethylsiloxane having a molecular weight of 600,000 and having 16 vinyl groups per molecule; and (ii) 40 g of calcined talc identical to that described above in Example 6.

After malaxation for 15 minutes at ambient temperature, 1.2 g of 2,4-dichlorobenzoyl peroxide were introduced into the resulting mixture and malaxation was continued for an additional 5 minutes.

The paste thus obtained was vulcanized in a Pinette-Emidecau compression-molding machine, in a mold, operating at 115° C. and under a pressure of 150.10⁵ Pa for 8 minutes. Test-pieces, the shape and dimensions of which correspond to the standard specifications governing the mechanical tests carried out, were then cut out. The tests which were carried out were as follows: tensile tests: the ultimate tensile strength and the elongation at break were measured as indicated by French Standard Specification T 46 002; measurement of the tear strength: this was carried out as indicated by ASTM Standard Specification D 624 A; and measurement of residual deformations after compression after 22 hours at 177° C. (RDC) this was carried out as indicated by ASTM Standard Specification D 395 B. The results of the mechanical tests carried out are reported in Table 6 which follows.

By way of comparison (test G), Example 7 was repeated, the 40 g of calcined talc being replaced by the same amount of non-calcined talc.

TABLE 6

| PROPERTIES | EXAMPLE/TEST | |
|---|---|---|
| | 7 | G |
| Tensile strength (MPa) | 2.2 | 1.6 |
| Elongation at break (%) | 220 | 275 |
| Tear strength (daN/cm) | 240 | 280 |
| RDC (%) | 24 | 96 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A moldable composition of matter comprising (i) a polymeric matrix and (ii) an inorganic reinforcing filler therefor, said reinforcing filler consisting essentially of an intimate admixture of enstatite and silica prepared by calcination of a precursor clay at a temperature of at least 800° C.

2. The composition of matter as defined by claim 1, further comprising (iii) a polymer/filler coupling agent.

3. The composition of matter as defined by claim 1 or 2, said precursor clay comprising chlorite, illite, palygorskite, saponite, talc, or mixtures thereof.

4. The composition of matter as defined by claim 3, said precursor clay comprising talc.

5. The composition of matter as defined by claims 1 or 2, said polymeric matrix (i) comprising a thermoplastic polymer.

6. The composition of matter as defined by claim 5, said polymeric matrix (i) comprising a polyolefin.

7. The composition of matter as defined by claim 5, said polymeric matrix (i) comprising a polyamide.

8. The composition of matter as defined by claim 5, said polymeric matrix (i) comprising a polycarbonate.

9. The composition of matter as defined by claims 1 or 2, said polymeric matrix (i) comprising a thermosetting polymer.

10. The composition of matter as defined by claim 9, said polymeric matrix (i) comprising a phenolic resin.

11. The composition of matter as defined by claim 9, said polymeric matrix (i) comprising a polyimide.

12. The composition of matter as defined by claims 1 or 2, said polymeric matrix (i) comprising an elastomeric polymer.

13. The composition of matter as defined by claim 12, said polymeric matrix (i) comprising a polychloroprene.

14. The composition of matter as defined by claim 12, said polymeric matrix (i) comprising an elastomeric silicone.

15. The composition of matter defined by claim 2, said coupling agent (iii) comprising a polyfunctional organosilicon compound containing at least one alkoxysilane moiety adapted to bond to the reinforcing filler (ii) and at least one moiety adapted to bond to the polymeric matrix (i).

16. The composition of matter as defined by claims 1 or 2, the amount of the reinforcing filler (ii) comprising from 2 to 90% by weight of the total weight of the polymeric matrix (i) plus reinforcing filler (ii), and the amount of coupling agent (iii), when present, comprising from 0.3 to 4% by weight of the weight of said reinforcing filler (ii).

17. A process for the preparation of the composition of matter as defined by claims 1 or 2, said polymeric matrix (i) comprising a thermoplastic or thermosetting polymer, which process comprises first intimately admixing the various constituents thereof by agitation, at ambient temperature, in a powder mixer, and thence homogenizing the intimate admixture which results by hot malaxation in a single-screw or multi-screw extruder.

18. A process for the preparation of the composition of matter as defined by claims 1 or 2, said polymeric matrix (i) comprising an elastomeric polymer, which process comprises intimately admixing the various constituents thereof directly in a heated slow mixer.

19. The process as defined by claim 17, said reinforcing filler (ii) having been preliminarily coated with coupling agent (iii), said coupling agent (iii) comprising a polyfunctional organosilicon compound containing at least one alkoxysilane moiety adapted to bond thereto, and at least one moiety adapted to bond to the polymeric matrix (i).

20. A molded shaped article comprising the composition of matter as defined by claims 1 or 2.

* * * * *